Figure 1:
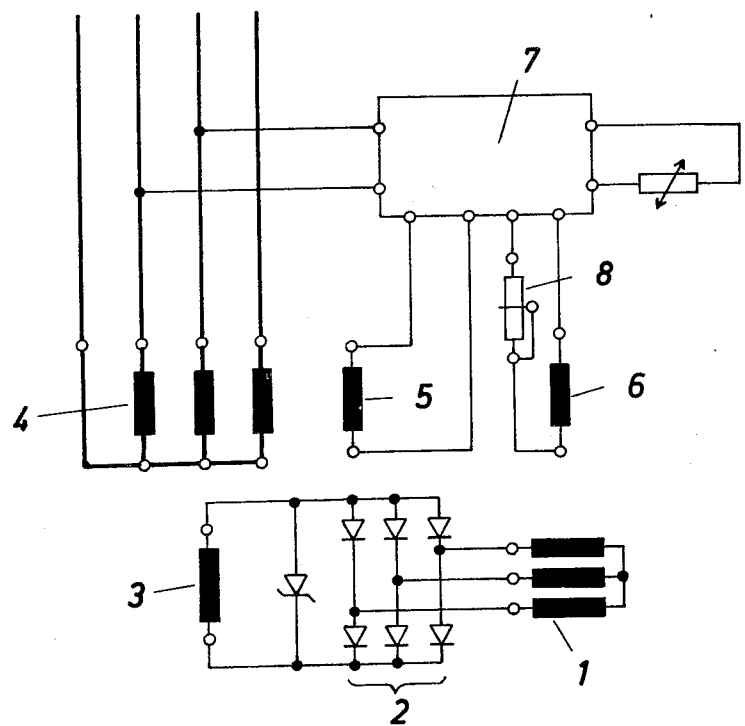

United States Patent [19]

Platzer

[11] 4,121,148
[45] Oct. 17, 1978

[54] BRUSHLESS SYNCHRONOUS GENERATOR SYSTEM

[75] Inventor: Hubert Platzer, Linz, Austria

[73] Assignee: Dipl.-Ing. Hitzinger & Co., Linz, Austria

[21] Appl. No.: 790,263

[22] Filed: Apr. 25, 1977

[30] Foreign Application Priority Data

Apr. 27, 1976 [AT] Austria .................................. 3079/76

[51] Int. Cl.² ........................ H02K 19/34; H02P 9/14
[52] U.S. Cl. .................................... 322/59; 310/198; 322/87; 322/90
[58] Field of Search ................. 322/59, 62, 87, 28, 322/90; 310/198

[56] References Cited

U.S. PATENT DOCUMENTS

| 3,676,764 | 7/1972 | Syverson | 310/198 X |
| 3,714,542 | 1/1973 | Arutjunian et al. | 322/90 X |
| 3,868,564 | 2/1975 | Arutjunian et al. | 322/90 X |
| 4,035,713 | 7/1977 | Kawamoto et al. | 322/87 X |

Primary Examiner—Robert J. Hickey
Attorney, Agent, or Firm—Kurt Kelman

[57] ABSTRACT

A generator has a stator which is provided with a multipole main winding and with an auxiliary winding, which is separate from and has the same number of poles as said main winding and a coil width not in excess of one-half of the pole pitch of said main winding. An exciter has a field-exciting winding. A controller is connected between said auxiliary winding and said field-exciting winding to energize the latter.

6 Claims, 3 Drawing Figures

BRUSHLESS SYNCHRONOUS GENERATOR SYSTEM

This invention relates to a brushless synchronous generator system comprising an exciter, which has a field-exciting winding which is fed by a controller, which is connected to a separate auxiliary winding, which is provided in the stator of the generator and has the same number of poles as the main stator winding.

The field-exciting winding of the exciter of a synchronous generator system may be energized by a pilot exciter, which has a permanent-magnetic salient-pole rotor, which induces in an auxiliary winding a load-independent a.c. voltage, which is then rectified, and a controller is provided, by which the rectified voltage is applied to the field-exciting winding of the exciter so that a field-exciting current flows therein. This direct current is also available when the synchronous generator is short-circuited so that a corresponding excitation of the synchronous generator ensures a continuous short-circuit current.

To avoid the additional expenditure involved in the provision of pilot exciter, it has been proposed to derive the current for exciting the field of the exciter from the generator. For this purpose the voltage output of the synchronous generator was connected via a rectifier to one end of the field-exciting winding, and a current transformer fed with the load current of the synchronous generator was connected to the other end of the field-exciting winding. As a result, current flowing in the field-exciting winding of the exciter had a load-independent component and a load-dependent one so that this arrangement for supplying exciting current to the exciter results also in a voltage control of the generator. On the other hand, this control is not sufficiently accurate so that additional controllers are provided.

When the synchronous generator connected in such circuit is short-circuited, the short-circuit current flowing through the current transformer ensures an adequate excitation of the exciter. On the other hand, the arrangement has the disadvantage that an expensive and bulky current transformer is required, which can be accommodated only if larger attached boxes or end plates are provided. Besides, additional adjusting work must be performed in the testing shop.

These drawbacks will not be changed when the load-independent component of the current for exciting the exciter is derived from the voltage across a separate auxiliary winding, which is disposed beside the main winding, rather than from the voltage across the stator winding of the generator.

An attempt to omit the current transformer gives rise to the problem of how the excitation can be ensured when the synchronous generator is short circuited so that the terminal voltages are zero. In case of a short circuit, an exciter current for the exciter can be derived from the field, which in case of a short circuit is highly distorted and has a large component which corresponds to the third harmonic. For this purpose, the stator of the generator is provided with an auxiliary winding, which has three times as many poles as the main winding so that it is not responsive to the fundamental wave of the field. In that arrangement, the exciting energy under no load is taken from the terminals of the generator. Under load, the excitation is supplemented by the auxiliary winding, which supplies the energy corresponding to the third harmonic of the field. With such circuitry, a useful voltage control of the synchronous generator will be ensured only if a sufficiently strong third harmonic is available. Whereas this can be accomplished by an intentional change of the pole pattern, such measures will reduce the utilization factor of the machine and its efficiency. Athough the field waveform of a synchronous machine is never strictly sinusoidal and there are always harmonic field components, which depend on the load on the machine, it is always desired to minimize these harmonic field components because they involve losses. Besides, it is difficult in such circuit arrangements to match the no-load and load components of the exciter currents.

For these reasons it is an object of the invention to avoid these disadvantages and so to improve a synchronous generator system of the kind described first hereinbefore that an adequate excitation is ensured even without need for a current transformer and without a pilot exciter whereas a distortion of the field is avoided as far as possible.

This object is accomplished according to the invention in that the coil width of the auxiliary winding does not exceed one-half of the pole pitch of the stator and is preferably one-third or one-fifth of said pole pitch. The turns of such auxiliary winding are not interlinked with the entire magnetic flux in one interpolar gap. Under no load and under a load in the usual range, this fact does not influence the voltage induced in that auxiliary winding because the latter is interlinked with the main field and the harmonic content of the main field is relatively small in these load ranges. On the other hand, in case of a short circuit, a voltage which is sufficient to produce the current required to excite the exciter is induced, although an optimum pole pattern has been provided and although the total field in one interpolar gap is minimized, except for stray fields which arise. The turns of the auxiliary winding are interlinked only with part of a field which is negligibly small only with respect to an entire interpolar gap but is not negligibly small with respect to part of such interpolar gap. Because the field configuration is highly distorted when the generator is short-circuited and this distortion is mainly determined by the third harmonic, it will be particularly desirable to select for the auxiliary winding a coil width which is equal to one-third of the pole pitch. Besides, there may be also fifth and seventh harmonics in a useful magnitude and these may also be taken into account if the coil width of the auxiliary winding is properly selected.

The voltage induced in the auxiliary winding provided according to the invention is used to excite the exciter field and under no load and under load has a waveform which is slightly overproportional with respect to the waveform of the terminal voltage, whereas when the generator is short-circuited the voltage across the auxiliary winding is sufficient for short-circuit excitation. There is no need for measures for distorting the usual configuration of the field, e.g., by a change of the pole pattern.

When the voltage of the synchronous generators is controlled in an obvious manner by a thyristor controller, it may be of advantage if the voltages induced in the main and auxiliary windings, respectively, pass through zero in succession rather than at the same time. This can be accomplished with simple means in that, in accordance with another feature of the invention, the arrangements of the main stator winding and of the auxiliary winding in the slots differ in such a manner that the voltages induced in said windings differ in phase. In such an arrangement, the selected distance between the ends of the main and auxiliary windings will determine the time interval between the zero crossovers.

Any d.c. controller provided for the exciter should be supplied with a direct current which does not have a strong ripple. This can be accomplished with simple means in that the auxiliary winding is a three-phase winding rather than a single-phase one.

To improve the utilization of the slots, the auxiliary winding may comprise at least two coils per pole and per phase.

Figure 2:
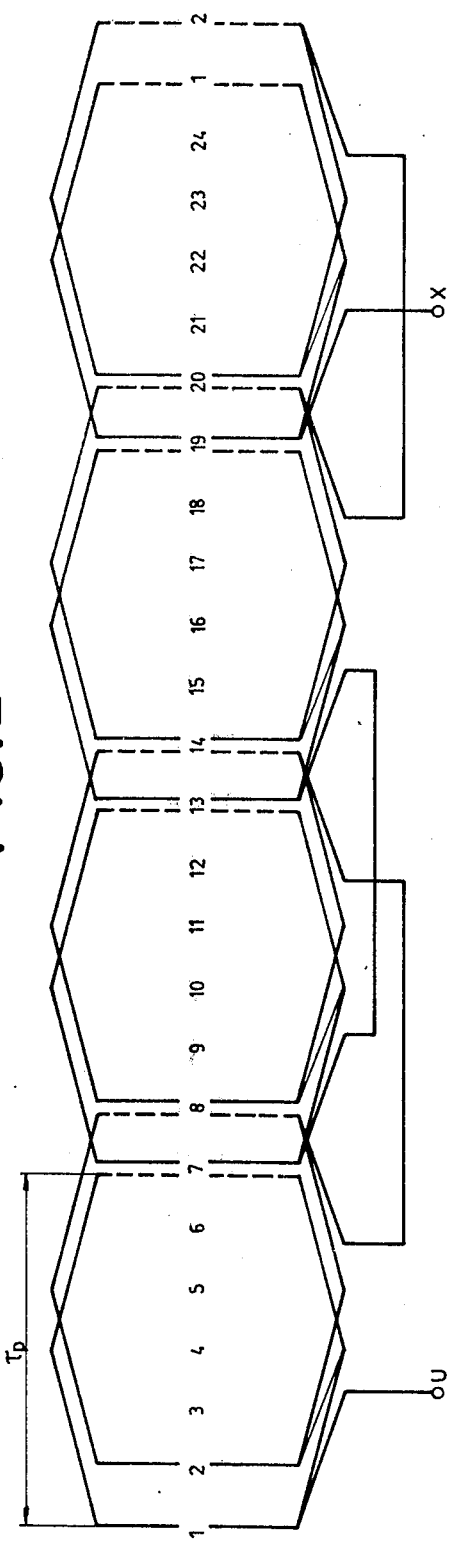
Figure 3:
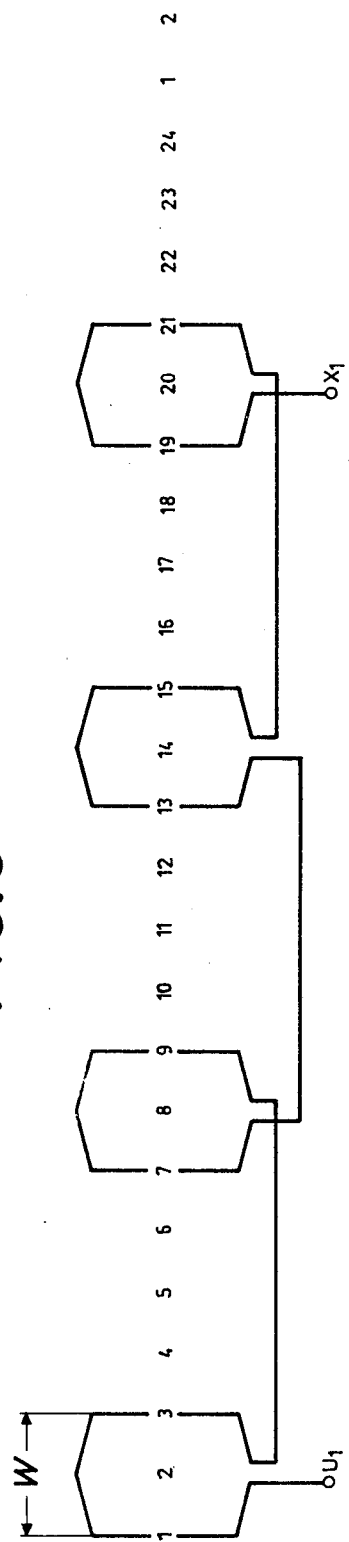

The invention is represented by way of example on the accompanying drawing, in which FIG. 1 is a block circuit diagram showing a synchronous generator according to the invention, FIG. 2 shows the circuit of the main stator winding and FIG. 3 the circuit of the associated auxiliary winding.

The excitation of the exciter causes a current to flow in its armature winding 1 and through the rotating rectifiers 2 to a salient-poll rotor winding 3 of the main machine to produce a corresponding salient-pole rotor field, by which a voltage is induced in the main winding 4, which is provided in the stator, and also in an auxiliary winding 5, from which power is supplied to a field-exciting winding 6 of the exciter via a controller 7. The voltage is controlled by the controller 7 in the usual manner. Under no load and under a usual load the voltage induced in the auxiliary winding 5 is substantially proportional to the terminal voltage of the generator and is only slightly influenced by harmonics. On the other hand, when the generator is short-circuited, the voltage and frequency depend mainly on the harmonic field components, which become effective because the coil width of the auxiliary winding 5 has been properly selected. The voltage which is induced by the harmonic field components in case of a short circuit thus ensures by means of the controller 7, the field-exciting winding 6, the armature winding 1 of the exciter, the rectifiers 2 and the salient-pole rotor winding 3 that a short-circuit current flows continuously in the main winding 4. The current value of the continuous short-circuit current depends on the dimensions of the three-phase a.c. exciter and may be adjusted by means of a series resistor 8.

As is apparent from FIG. 2, the phase windings of the main winding 4 are inserted in the 24 slots of the stator in such a manner that there are two coils per pole and per phase and the width of each coil is equal to the pole pitch $T_p$ of the stator. For the sake of clearness, only one of the three phase windings is shown. It will be understood that chorded windings may be used rather than the diametral winding which is shown.

Beside the main winding, the stator slots contain an auxiliary winding which has the same number of poles as the main winding but a coil width W which differs from the coil width of the main winding and, as shown in FIG. 3, is equal to one-third of the pole pitch $T_p$ of the stator. In such an arrangement, in a four-pole machine having 24 stator slots, the two ends of a coil of the auxiliary winding are spaced two slot pitches apart. Even when the flux interlinked with a coil of the main winding almost disappears because the flux components substantially offset each other within an interpolar gap corresponding to the pole pitch $T_p$, the auxiliary winding will respond to such flux components so that the flux interlinked with each coil of the auxiliary winding induces a voltage therein.

In view of the configuration by the field in case of a short circuit, the auxiliary winding is preferably tuned to the third harmonic of the field and thus ensures the flow of a continuous short-circuit current in the generator without need for undesired changes of the pole pattern.

What is claimed is:

1. A brushless synchronous generator system, comprising
  a generator having a stator which is provided with a multipole main winding and with an auxiliary winding, which is separate from and has the same number of poles as said main winding and a coil width not in excess of one-half of the pole pitch of said main winding,
  an exciter having a field exciting winding, and
  a controller connected between said auxiliary winding and said field-exciting winding to energize the latter.

2. A brushless generator system as set forth in claim 1, in which said coil width of said auxiliary winding equals one-third of said pole pitch.

3. A brushless generator system as set forth in claim 1, in which said coil width of said auxiliary winding equals one-fifth of said pole pitch.

4. A brushless generator system as set forth in claim 1, in which
  said stator has a plurality of slots,
  means are provided to induce voltages in said main winding and said auxiliary winding and
  said main winding and said auxiliary winding are disposed in said slots different arrangements in such a manner that said voltages thus induced in said main winding and said auxiliary winding, respectively, differ in phase.

5. A brushless synchronous generator system as set forth in claim 1, in which said auxiliary winding is a three-phase winding.

6. A synchronous generator as set forth in claim 1, in which said auxiliary winding comprises at least two coils per pole and per phase.

* * * * *